Jan. 13, 1931. J. C. GROBLE 1,788,429
ELECTRICALLY CONTROLLED PRESSURE REGULATING SYSTEM
Filed Dec. 22, 1928 2 Sheets-Sheet 2
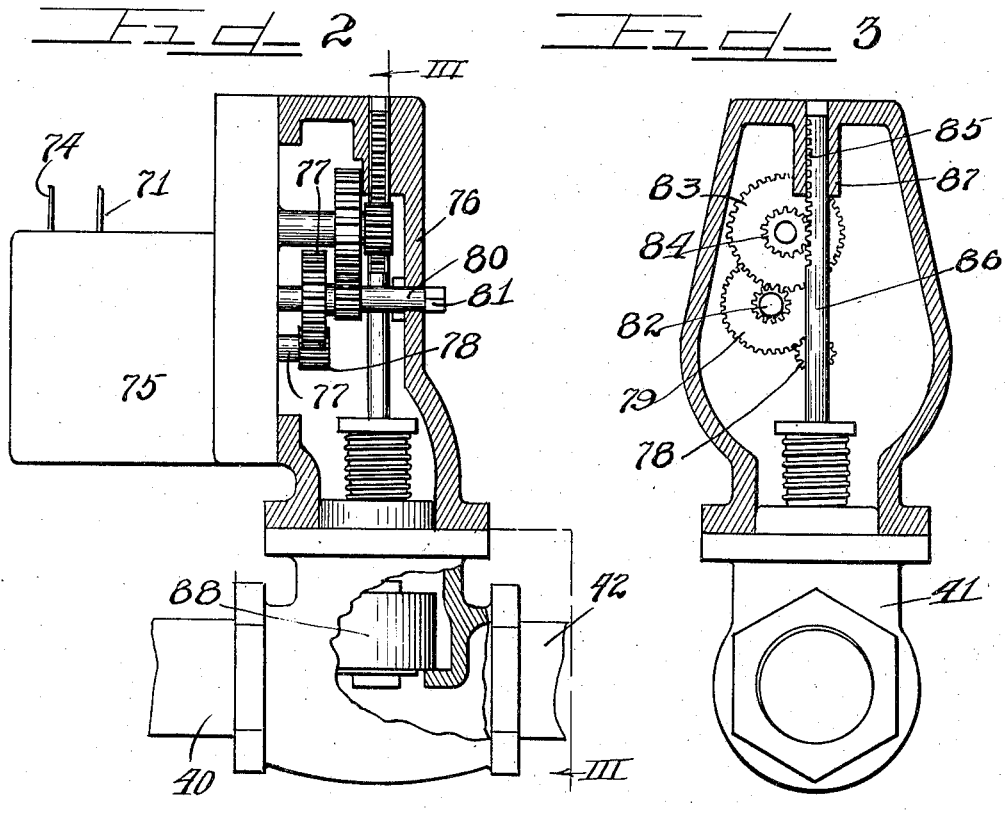
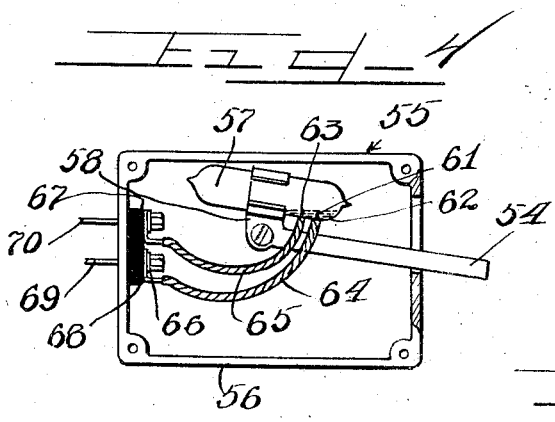
Inventor
Jacob C. Groble
by Charles Toll
Attys.

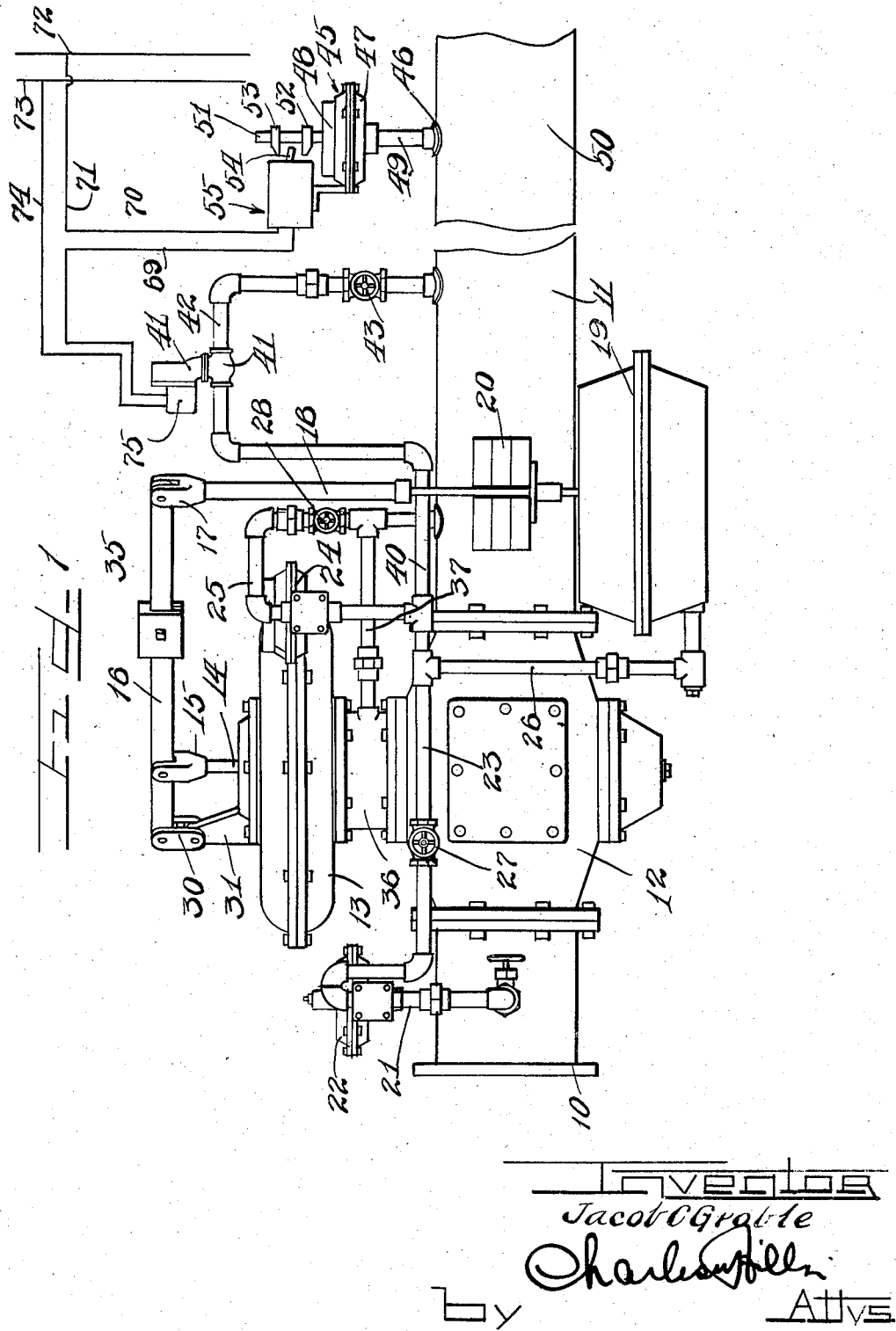

Patented Jan. 13, 1931

1,788,429

UNITED STATES PATENT OFFICE

JACOB C. GROBLE, OF ANDERSON, INDIANA, ASSIGNOR TO GROBLE GAS REGULATING COMPANY, OF ANDERSON, INDIANA, A CORPORATION OF INDIANA

ELECTRICALLY-CONTROLLED PRESSURE-REGULATING SYSTEM

Application filed December 22, 1928. Serial No. 327,836.

The present invention relates to a pressure regulating system and more particularly to an improvement in regulators especially applicable to pressure regulating systems of the Reynolds type for automatically increasing and decreasing the outlet pressure of the regulator by remote control.

It is well known in the pressure regulating art that the ordinary regulating system is incapable of at all times meeting the fluctuations in demand at the consumer's end of the mains associated with the system. This is especially true during periods of high or abnormal demand. One of the difficulties which contributes to this condition resides in the fact that most systems do not take into account the frictional loss in pressure of the fluid or gas through the mains. Obviously, the greater the length of main connected to the system, the greater will be the frictional loss in pressure, and as a result the system is unable to promptly meet the fluctuations in demand at the outlet or consumer's end of the mains.

It has been attempted to solve this difficulty by at all times maintaining a high regulator pressure throughout the entire distributing system, but this has proved unsatisfactory due to the fact that the leakage loss in such a system is very high.

Hence it has been found that the most satisfactory way of controlling the flow of fluid through a distributing system is to provide the end of the distributing line with a regulating device responsive to pressure for controlling the distant regulating system proper. Such a system with an auxiliary control of that type is usually referred to as a remote control pressure regulating system. It is with this type of system that the present invention is concerned.

I find that heretofore pressure regulating systems of the Reynolds type have not been remotely controlled for the reason that no suitable device is available for effecting such control. I therefore propose to provide regulating systems of the so-called Reynolds type with a remote control feature whereby a system will, during periods of high demand, promptly increase the outlet pressure in the regulating system, so that the abnormal demand at the consumer's or distributing end of the system is promptly met.

An object of the present invention is to provide pressure regulating systems of the Reynolds type with a remote control for enabling the system to promptly meet the pressure required during periods of high or abnormal demand.

Another object of the present invention resides in the provision of an auxiliary electrical pressure regulating device especially adapted for use in conjunction with a pressure regulating system of the Reynolds type and adapted to increase the outlet pressure afforded by the regulating system proper during periods of high or abnormal demand.

In accordance with the general features of the present invention, there is provided a pressure responsive device at the consumer's end of a gas distributing line, an electrically operated valve connected to and controlled by the pressure responsive device at a distance from the device and a pipe connection including said valve for bypassing liquid around the low pressure auxiliary regulator of the pressure regulating system proper whenever the valve is operated by the pressure responsive device whereby the pressure on the outlet side of the system is promptly increased to meet abnormal demands at the distributing end.

Other and further important objects of this invention will be apparent from the disclosures in the drawings and specification.

The invention (in a preferred form) is illustrated in the drawings and hereinafter more fully described.

On the drawings:

Figure 1 is an elevation of a pressure regulating system of the Reynolds type provided with my novel auxiliary and remote control regulating device.

Figure 2 is an enlarged view of the electrically operated valve partly in section.

Figure 3 is a sectional view taken on substantially the line III—III of Figure 2 looking in the direction indicated by the arrows.

Figure 4 is an enlarged fragmentary view partly in section of the mercury switch operable by the remote regulator for controlling the operation of the valve shown in Figure 2.

As shown on the drawings:

Like reference characters designate similar parts throughout the several views. The reference characters 10 and 11 designate generally the inlet and outlet ends of a pressure regulating system to which my invention is applicable. Attention is directed to the fact that the system shown in Figure 1 embodies the features and principles of the well-known Reynolds pressure regulating system and hence operates in substantially the same way as the latter with the exception of the improvements comprising the present invention. Positioned between the inlet and outlet is a main regulator designated generally by the reference character 12, above which is disposed a main regulator diaphragm bowl 13. The diaphragm in the bowl 13 is connected to the lower end of a rod 14, the upper end of which is forked at 15. This forked end 15 is pivotally connected to an intermediate portion of a main regulator lever 16, one end of which is pivotally connected to the forked upper end 17 of a rod 18 having its lower end connected to the diaphragm in a master bowl 19. The rod 18 carries a plurality of weights 20 for weighting the diaphragm in bowl 19.

The inlet 10 has connected to it one end of a pipe line 21, the other end of which is connected to the inlet side of a high pressure auxiliary or secondary regulator 22. The outlet side of this pressure regulator 22 is connected by a pipe line 23 to the inlet side of the low pressure auxiliary or secondary regulator 24. Also connected to this pipe line 23, as I shall more fully describe hereinafter, is a pipe line 40 leading to the electrically operated valve 41 of my auxiliary regulating system. The outlet side of the auxiliary regulator 24 is connected by a pipe line 25 to the outlet 11 of the system.

An intermediate portion of the pipe line 23 is disposed in communication with the upper end of a pipe line 26, the lower end of which is disposed in communication with the lower chamber of bowl 19. The hand valve 27 is connected to the pipe line 23 on the high pressure side of the line 26 and is adapted to be manually operated to control the flow of fluid to the low pressure regulator. The outlet side of the auxiliary low pressure regulator has connected to it a hand valve 28, by means of which the flow of fluid from this regulator to the outlet 11 may be manually adjusted.

The primary lever 16 has pivotally connected to its other end adjacent the forked end 15 of rod 14, a link connection 30, both ends of which are bifurcated. The upper end of the link is pivotally connected to the primary lever 16 and its lower end is pivotally connected to a bracket 31 secured to the top of the main regulator bowl 13. Slidably mounted on the primary lever 16 is an adjustable weight 35 by means of which pressure on the diaphragm in the bowl 13 may be varied.

It will be noted that the main regulator housing 12 is connected to the bowl 13 by a flanged tube 36, which has connected to it one end of a pipe 37, the other end of which is connected to the pipe line 25 connecting the discharge of the auxiliary regulator 24 to the outlet 11. This pipe line 37 comprises an equalizer pipe and serves to relieve the chamber in the tube 36 from any gas pockets, so that the pressure in this chamber and in the outlet of this regulator system is substantially the same.

The system thus far described is substantially like the Reynolds regulator and is well-known in the art. I shall now proceed to describe in detail my improved auxiliary and remote control device adapted for connection with the underside of the auxiliary bowl 19 through the pipe lines 23 and 26 for the purpose of at predetermined times bypassing the fluid or gas around the low pressure secondary regulator 24 into the outlet 11 in response to an abnormal demand in the consumer's end of distributing mains.

As previously described, a pipe line 40 serves to connect the inlet side of the valve 41 with the pipe lines 23 and 26 of the regulating system. The outlet side of the valve 41 is connected by means of a pipe line 42 to the outlet 11 of the distributing main. A hand controlled valve 43 is connected to the pipe line 42. The two pipe lines 40 and 42, including the valve 41, comprise a bypass connection for bypassing the fluid in pipes 23 and 26 for bypassing the fluid under the diaphragm in bowl 19 around the low pressure auxiliary regulator 24 directly into the outlet 11 Obviously, by increasing the flow from under the diaphragm in bowl 19, the pressure under the diaphragm in this bowl drops and as a result the primary lever 16 falls, thereby increasing the opening of the main valve.

It is the valve 41 which controls the flow of fluid through the bypass pipes 40 and 42. This valve is controlled by a pressure responsive bowl 45 connected to the gas distributing line at a point 46, which is distant from the regulating system proper. In fact the point 46 may be disposed at or adjacent the consumer's or distributing end of the gas main.

The bowl 45 is conventional and comprises upper and lower chambers 47 and 48 separated by a conventional diaphragm (not shown). The lower chamber 47 is connected by pipe line 49 to the point 46 in the end of the distributing line 50. Extending out of chamber 48 and connected to the diaphragm in the bowl 45 is a stem 51 having secured thereto two laterally extending lugs 52 and 53 between which projects a switch operating element 54 of a switch designated generally by the reference character 55. The switch 55, as shown in Figure 4, is disposed in a housing 56 and comprises a sealed glass tube 57 rigidly mounted in a holder 58, pivotally mounted at 59 to the side of housing 56. The operating arm 54 is shown as being rigidly connected to the holder 58 so that movement of the arm 54 will result in the tilting of the glass tube about its pivot. Disposed in the tube 57 is a quantity of mercury 61 which serves to connect contacts 62 and 63 extending into the interior of the glass tube 57. These contacts are connected by conductors 64 and 65 respectively, to terminals 66 and 67 on a terminal block 68 secured to a side of housing 56. The terminals 66 and 67 are in turn connected to electrical conductors 69 and 70.

As shown in Figure 1 the conductors 69 and 70 are part of a line 71 connected to a power line 72. The other power line 73 is connected to a conductor 74. The two conductors 71 and 74 are connected to an electric motor 75 associated with the valve 41.

The electric motor, designated by the reference character 75, is of conventional construction and is rigidly attached to the side of a gear housing 76 secured to the top of valve 41, which valve also is of conventional construction. The armature shaft 77 of the motor 75 extends into the housing 76 and carries a small pinion 78 meshing with a larger gear 79 mounted on an auxiliary shaft 80 having its ends suitably journalled in the walls of the housing 76. One end, 81, of this shaft 80 extends out of the housing 76 and is squared so as to accommodate a wrench or the like whereby the gears may be manually operated.

The shaft 80 also has secured to it a smaller gear 82 meshing with a large gear 83, which has rigidly connected to it a small gear 84 meshing with a rack 85 formed on the upper end of a valve operating rod 86. The upper end of this rod 86 extends into a tubular boss 87 formed integral with the rod 86. The lower end of this rod 86 is connected to the reciprocable member 88 of conventional valve 41. From the foregoing it will be evident that when the motor 75 is actuated, the rod 86 may be reciprocated to either raise or lower the valve element 88 so as to open and close the valve 41.

The operation of my novel auxiliary and remote control for the Reynolds system is briefly as follows: The low pressure or secondary regulator 24 is weighted for the minimum outlet pressure. The main regulator lever 16 is weighted with weights 35 and the master bowl stem 18 is weighted with weights 20 for the maximum outlet pressure. The independent pressure regulating bowl 45 is weighted for the minimum pressure that is desired at the point 46.

Now as the pressure drops adjacent point 46, which, for example, may be due to an abnormal demand, the diaphragm stem 51 operates the electric switch 55, thus closing the circuit associated therewith and causing the motor 75 to come into play. This motor operates the rack 85 and opens the valve 41. As a result of the opening of the valve 41, the fluid is by-passed around the low pressure auxiliary regulator 24 from the pipes 23 and 26, thus decreasing the pressure under the diaphragm of the bowl 19. Thereafter the weights 35 and 20 become effective to maintain the maximum pressure at the outlet of the system whereby the abnormal demand for fluid at point 46 in the distributing line 50 is met.

When the pressure at the point 46 increases to an amount at which the diaphragm of the bowl 45 is weighted for, then the diaphragm stem 51 is raised, the lower lug 52 comes into contact with the switch operating arm 54 and as a result tilts the switch to its open position. This in turn breaks the circuit and stops the motor 75.

Thereafter, the valve stem 86 of valve 41 is forced downwardly by the weight of valve element 88 thus closing the valve and allowing the fluid to again pass through the auxiliary low pressure regulator 24.

It is to be noted that the instant the electric valve 41 is opened the secondary regulator 24 is closed due to the increase in the outlet pressure, and the same flow of gas coming through the high pressure secondary regulator 22 and passing through the needle-point valve 27 is equalized with the pressure under the master bowl 19 and the pressure in the outlet pipe line 11 leading from the regulator.

When the electric valve 41 is wide open valve 43 can be adjusted to give the proper gas flow through the electric valve so as to eliminate any possibility of a so-called "hunting action". However, if valve 43 was wide open the pressure in the distributing system acts as a cushion against the pressure under the master bowl 19 which would prevent any hunting action on the part of the main regulator 13.

It must be understood that the master bowl stem 18 is weighted with weights 20 and the lever 16 is weighted with weight 35 for the maximum outlet pressure which is controlled as above stated and by-passes regulator 24 which is closed off the instant electric valve 41 is opened and allows a free flow of gas from underneath the master bowl into the low pressure main leading to the distribution system. This causes the pressure to increase and the instant that the electric valve 41 is closed the pressure gradually drops in the distribution system until it reaches the minimum pressure that regulator 24 is set to operate at, at which time this regulator comes into action and controls the action of the main regulator at the minimum pressure.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In combination, a fluid distributing main, a pressure regulating system of the Reynolds type associated with said main and control means connected to said line at a point remote from said system responsive to the flow of fluid past said point for acting on said system to maintain a relatively constant pressure in the line at said point.

2. In combination, a fluid distributing main, a pressure regulating system of the Reynolds type associated with said main, and control means connected to said line at a point remote from said system responsive to the flow of fluid past said point for acting on said system to maintain a relatively constant pressure in the line at said point, said control means comprising a pressure responsive device and an electrically operated valve positioned adjacent the system and controlled by said device.

3. In combination, a fluid distributing main, a pressure regulating system of the Reynolds type associated with said main, and control means connected to said line at a point remote from said system responsive to the flow of fluid past said point for acting on said system to maintain a relatively constant pressure in the line at said point, said control means comprising a pressure responsive device, an electrical switch associated therewith and controlled thereby, a circuit associated with said switch, a motor in said circuit and a valve operated by said motor, located adjacent said system.

4. In combination with a pressure regulating system of the Reynolds type, associated with a fluid distributing line, means connected to the distributing line at a point distant from the system for at predetermined times acting upon said system to increase the pressure in said system.

5. In combination with a pressure regulating system of the Reynolds type, including a low pressure auxiliary regulator associated with a fluid distributing line, means connected to said line at a point remote from said system for at predetermined times by-passing the fluid around said auxiliary regulator directly into the outlet side of the system, so as to maintain a substantially constant pressure at said point in the line.

6. In combination with a pressure regulating system of the Reynolds type, associated with a fluid distributing line, pressure responsive means connected to said line at a point distant from said system for acting upon said system so as to maintain a relatively constant pressure at said point.

7. In combination with a pressure regulating system of the Reynolds type, associated with a fluid distributing line, pressure responsive means connected to the consumer's end of the line for at predetermined times acting upon said system to increase the pressure at the outlet side of the system so as to maintain a relatively constant pressure at said distributing end.

8. In combination with a pressure regulating system of the Reynolds type, including a low pressure auxiliary regulator associated with a fluid distributing line, means for by-passing fluid around said auxiliary regulator directly into the outlet side of the system, valve means associated with said bypass means and pressure responsive means connected to the distributing end of said line for opening and closing said valve means.

9. The method of controlling a pressure regulating system of the Reynolds type, including low pressure auxiliary regulator which consists in bypassing the fluid around the low pressure auxiliary regulator at predetermined times so as to increase the pressure at the outlet side of the system and controlling said bypassing of the fluid in response to the pressure prevailing at a distant point in the distributing line, so that a relatively constant pressure may be maintained at all times at the end of the distributing line.

10. The method of controlling the operation of a pressure regulating system of the Reynolds type, including a low pressure auxiliary regulator, so as to maintain a relatively constant pressure at the consumer's end of a distributing line, which consists in rendering the low pressure regulator ineffective by bypassing the fluid or gas around the low pressure regulator into the outlet of the system whenever the pressure at a remote point in the distributing line falls below a predetermined amount, so as to enable a substantially constant pressure to be maintained at that point.

11. In combination with a pressure regulating system including a low pressure auxiliary regulator associated with a fluid pressure distributing line, fluid responsive means connected to the distributing line at a point remote from the system and by-pass means adjacent said auxiliary regulator and operative by said fluid responsive means for at predetermined times by-passing the fluid around said regulator.

12. In combination with a Reynolds pressure regulating system including a low pressure auxiliary regulator associated with a fluid distributing line, fluid pressure responsive means connected to the distributing line at a point remote from the system and fluid conducting means adjacent said regulator and operable at predetermined times to render said auxiliary regulator inoperative so as to increase the flow of fluid through said system.

13. In combination with a pressure regulating system including a low pressure auxiliary regulator and main regulator bowl associated with the fluid distributing line, supplemental fluid pressure responsive means associated with said line for at predetermined times rendering said auxiliary regulator inoperative so as to cause the output of said system to be controlled by said main regulator bowl.

14. In combination with a pressure regulating system including a low pressure auxiliary regulator and a weighted main regulator valve and regulator bowl associated with the fluid distributing line, supplemental fluid pressure regulator means associated with said line for at predetermined times rendering said auxiliary regulator inoperative so as to cause said main valve and regulator bowl to control the output of said system as a function of the weights connected thereto.

In testimony whereof I have hereunto subscribed my name at Anderson, Indiana, county of Madison.

JACOB C. GROBLE.